United States Patent
Kimura et al.

[15] 3,692,384
[45] Sept. 19, 1972

[54] CURVED PROJECTION SCREENS

[72] Inventors: Hiroshire Kimura, Uji-shi, Kyoto; Takeshi Nambu, Neyagawa-shi, Osaka; Kiyoshi Inoue, Uji-shi, Kyoto; Yoshiyuki Imahori, Naka-kyo-ku, Kyoto-shi, Kyoto; Kenjyo Yamaguchi, Kyoto-shi, Kyogo; Kyozo Umeno, Uji-shi, Kyoto, all of Japan

[73] Assignee: Kabushiki Kaisha Midoukai, Osaka-shi, Japan

[22] Filed: May 15, 1970

[21] Appl. No.: 37,642

[30] Foreign Application Priority Data

May 15, 1969 Japan..................44/37516
May 20, 1970 Japan..................45/38962
Feb. 9, 1970 Japan..................45/11367

[52] U.S. Cl..................350/119, 350/125, 350/129
[51] Int. Cl...........................G03b 21/56
[58] Field of Search........350/119, 125, 129; 352/36, 352/43, 86

[56] References Cited

UNITED STATES PATENTS 3,408,132 10/1968 Chandler..................350/125
3,016,794 1/1962 Crandon..................350/119
1,785,330 12/1930 Schoonmaker............350/119
2,019,675 11/1935 Hertzberg..................350/119
3,180,215 4/1965 Hourdiaux..................350/125
3,260,156 7/1966 Komitor....................350/119
2,983,190 5/1961 Betz et al..................350/129

Primary Examiner—Louis R. Prince
Assistant Examiner—Joseph W. Roskos
Attorney—Sughrue, Rothwell, Mion, Zinn & Macpeak

[57] ABSTRACT

A curved wide angle projection screen fabricated of a material having vertical ridges for effectively reflecting toward the audience a high percentage of light incident upon the screen. In addition, the projection screen is provided with a plurality of holes for permitting efficient sound transmission through the screen. Finally, a large number of tape-shaped elements are attached in a louver fashion to the screen frame to overcome the difficulties inherent in curved screens.

6 Claims, 14 Drawing Figures

INVENTORS
HIROSHIRO KIMURA
TAKESHI NAMBU
KIYOSHI INOUE
YOSHIYUKI IMAHORI
KENJYO YAMAGUCHI
KYOZO UMENO

BY Sughrue, Rothwell, Mion, Zinn & Macpeak

ATTORNEYS

CURVED PROJECTION SCREENS

BACKGROUND OF THE INVENTION

The present invention relates to curved projection screens and more particularly to curved projection screens used for wide angle picture projection which have the property of effectively reflecting toward an audience area the incident light projected by means of a projector. These screens also provide a bright and sharp projected image to the audience by reducing as low as possible the reflection of the projection to other directions than the direction of the audience. Screens designed in accord with this invention are especially valuable in cases where cylindrically curved screens surround the greater part of an audience area or spherical screens surrounding the upper portion of the audience area are employed.

Recently, the scenes projected by means of a motion picture projector or a slide projector have generally widened and hence curved screens tend to be frequently employed. For example, cylindrical screens surrounding most parts or the whole of the audience area or hemi-spherical screens arranged above the audience area have been employed.

Screens of these types show, however, some noticeable disadvantages. It is the primary function of a projection screen to reflect light projected by a projector, so that spectators can view correct and sharply projected images from any part of the scene at any place in the audience area. But if curved screens, in particular hemi-spherical, curved screens, having a flat optical directivity are used, the projected light from a projector is scattered to every direction at the surface of the screen, whereby less of the reflected light reaches the audience area and hence for providing bright projected images to the audience area, a light source having a high intensity is required. Also, since light is scattered to every direction, the light reaching a certain portion of the screen is reflected to other portions of the screen, which results in the following drawback. When, for example, an image to be projected as a projected image comprising dark portions and very bright portions is projected, the light reflected at the bright portions of the screen reaches the dark portions of the screen to brighten the dark portions, which hinders the reproduction of the real dark effect. This is also true in the case of projecting color photographs. For example, a potion of a projected image to be reproduced as a blue portion is impinged by the reflected light from red portions and yellow portions of the projected image and thus becomes grayish and the sharpness of the image is greatly reduced.

On the contrary, in the case of using a screen having a sharp optical directivity, the aforesaid reduction in sharpness of a projected image by the undesirable reflection will not occur if the disposition angle of the screen is kept sharp. However, as the light reflected at the screen propagates predominantly in a definite direction, the light reflected to other directions than the definite direction is weak. Hence, it is difficult in such cases to project a bright image to any seat in an audience area. Furthermore, the aforesaid type of screen is accompanied by an additional drawback. If the screen is disposed at an angle slightly different from a definite angle, the state of reflection of light is changed and it is difficult to maintain uniform brightness.

Besides the above-mentioned optical properties, it is preferable in the case of employing a wide screen or a spherical screen to place sound sources such as speakers at several positions behind the screen so as to get the sounds from the corresponding positions of a projected image on the screen for providing for the audience a more realistic impression and giving the illusion of being in the midst of the scene appearing on the screen. In such case, it is necessary that the sounds from these sound sources can efficiently pass through the screen with a minimum of sound distortion.

SUMMARY OF THE INVENTION

An object of the present invention is to provide a curved screen for wide projection image in which the whole portions of the projected image on the screen can be viewed clearly and brightly from any portion of the audience area.

Another object of this invention is to provide a curved screen which permits adequate sound transmission with a minimum of acoustical distortion.

These objects can be attained by providing a screen having a sharp optical directivity in the vertical direction on the surface of the screen and a moderate optical directivity in the horizontal direction and having spaces for transmitting sound and vertically extending ridges on the screen surface. In addition, to help overcome the problems presented by a curved screen, a screen can be provided which is composed of a large number of tape-shaped elements each having adequate light reflection characteristics, said elements being disposed in the direction perpendicular to the vertical direction in the state of louver and each element being kept ideally inclined.

For the purpose of understanding and practicing the present invention, the various preferable embodiments of this invention will be described practically by referring to the accompanying drawings, in which:

DETAILED DESCRIPTION OF THE INVENTION

Figure 1:
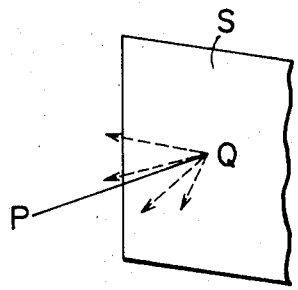
FIG. 1 is a view showing incident light from a projector P reflected at optional point Q on the surface of a screen.
Figure 2:
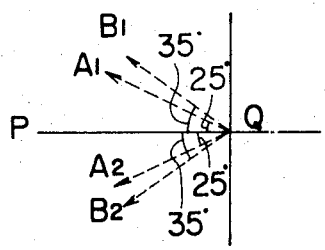
FIG. 2 is a sectional view taken through a vertical plane containing the line P–Q of FIG. 1.
Figure 4:
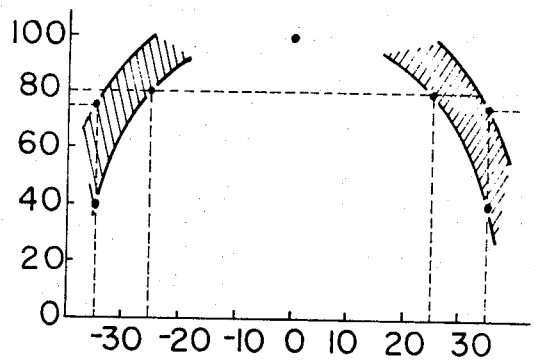
FIG. 4 is a graph showing the ratio of the intensity of the reflected light in any direction to the intensity of the light reflected in the plane containing the path of the incident light perpendicular to the screen surface as well as to a vertical line on the screen surface.

Referring to FIG. 1, the light projected by means of a projector P reaches an optional point Q on the surface of a screen and is reflected to all directions. For facilitating understanding, the incident light is assumed to be perpendicular to the surface of the screen on a vertical plane. As shown in FIG. 2, if the ratio of the intensity of the reflected light to the intensity of the light at the maximum reflection direction QP, i.e., the plane of the incident light, is at least 80 percent in the direction $QA_1$ or $QA_2$, i.e., the direction inclined from the direction QP at an angle of 25° and also 40–75 percent in the direction $QB_1$ or $QB_2$, the direction inclined from the direction QP at an angle of 35°, the reflected light can be efficiently propagated to the audience area, the projected image can be seen clearly from any portions of the audience area, and also the intensity of harmful reflected light to other areas than the audience area is small. In other words, it is necessary to obtain good results that the ratio of the intensity of the reflected light along a vertical line on the screen to the intensity of the reflected light in the plane containing the path of the incident light to be that which is shown in the hatched areas in FIG. 4.

The intensity of the reflected light varies continuously as the direction of the reflected light is deviated from the direction of the reflection light in the plane of incident light. In other cases than the aforesaid range, for example, in the case where the intensity of the reflected light i.e., the direction $QA_1$ or $QA_2$, i.e., the direction inclined from the direction of the maximum reflected light at an angle of 25° is lower than 80 percent of the intensity of the maximum reflected light in the direction of QP, the projected image on the screen viewed at aforesaid direction is darkened and cannot maintain uniform brightness or clearness. Furthermore, if the intensity of the reflected light to the direction $QB_1$ or $QB_2$, i. e., the direction inclined from the direction of the maximum reflected light at 35° is higher than 75 percent of the intensity of the maximum reflected light, reflection to other areas of the screen is increased, which reduces the projection effect.

Figure 3:
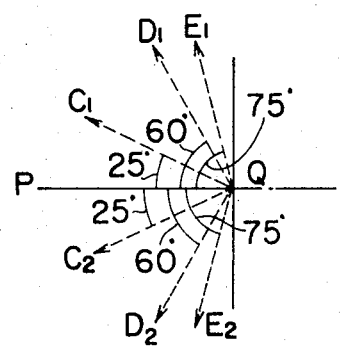
FIG. 3 is a sectional view taken through a horizontal plane containing the line P–Q of FIG. 1.
Figure 5:
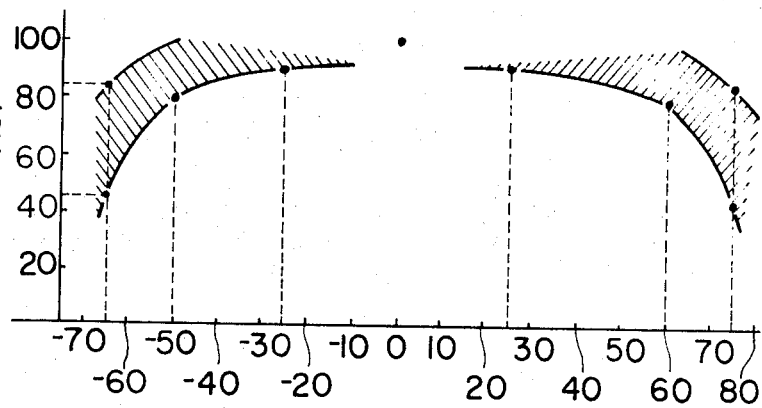
FIG. 5 is a graph showing the ratio of the intensity of the reflected light to any direction to the intensity of the light reflected in the plane containing the path of the incident light as well as a line perpendicular to the vertical line on the screen surface.

Further, as shown in FIG. 3 and FIG. 5, in regard to a plane containing a line perpendicular to the aforesaid vertical line and to the path of the incident light, i. e., a horizontal line, if the ratio of the intensity of the reflected light to the intensity of the maximum reflected light which is in the plane of incident light is at least 90 percent in the direction $QC_1$ or $QC_2$, i. e., the direction inclined from the direction QP at an angle of 25°, and at least 80 percent in the direction $QD_1$ or $QD_2$, i. e., the direction inclined from the direction QP at an angle of 60°, and 45–85 percent in the direction $QE_1$ or $QE_2$, i. e., the direction inclined from the direction QP at an angle of 75°, the projected image on the screen can be seen clearly or brightly from any seat of a wide audience area and irregular reflection to the directions other than the directions of the audience area is small. That is, it is necessary that the ratio of the intensity of the reflected light to the intensity of the maximum reflected light which is in the plane containing the path of the said incident light along a horizontal line on the screen surface to be that shown in the hatched areas in FIG. 5. If the ratio is not in the range, for example, if the ratio of the intensity of the reflected light to the intensity of the maximum reflected light is lower than 90 percent in the direction $QC_1$ or $QC_2$, i.e., the direction inclined from the direction QP to an angle of 25° or if the ratio is lower than 80 percent in the direction $QD_1$ or $QD_2$, i. e., the direction inclined from the direction QP at an angle of 60°, the brightness or clearness of the projected image is reduced when viewed in certain seats in the audience area. On the other hand, if the ratio is higher than 85 percent in the direction $QE_1$ or $QE_2$, i. e., the direction inclined from the direction QP, at an angle of 75°, the irregular reflection is harmfully increased.

The optimum optical directivity of the screen is fundamentally determined by the relation between the position of screen and the position of an audience area, the psychological feeling of satisfaction of audience to the projected image, and the relative relation between the uniformity of the projected image and the intensity of scattered light. The applicants have discovered as the result of conducting wide ranges of experiments that when the screen having the above-mentioned optical properties is employed, the psychological feeling of satisfaction of the audience to the projected image is of the highest.

In regard to sonic characteristics, it is desirable that sound can pass from behind the screen out into the audience area and also that the sound reach the screen from sound sources such as sounds generated in the hall are entirely absorbed by the screen without reverberation. In this case, good results can be obtained by using a screen having excellent sound transmitting property and providing a sound absorber behind the screen. About the sound transmitting property of the screen, it is necessary that the average sound transmittance at 100, 160, 250, 400, 640, and 1,000 cycles per second is at least 90 percent and also the average sound transmittance at 1.6, 2.5, 4, 6.4, and 10 kilocycles per second is at least 80 percent. Further, it is also necessary that the sound absorber to be applied behind the screen have an acoustic absorptivity of at least 90 percent throughout the range of 300 cycles/sec. to 4 kilocycles/sec. The suitable materials for the sound absorber are glass fibers, insulation boards, and foamed synthetic resins.

The screen having the aforesaid optical characteristics and sonic characteristics gives excellent projection effect as a curved screen. It is noticeable that the aforesaid vertical line corresponds to a meridian in case of hemi-spherical screens surrounding the upper portion of the audience areas. The practical structure of such curved screen will be explained below.

The screen has a number of parallel ridges on the surface of the screen facing the audience area in the vertical direction of the screen and spaces between the ridges for transmitting the sound through the screen.

Figure 6:
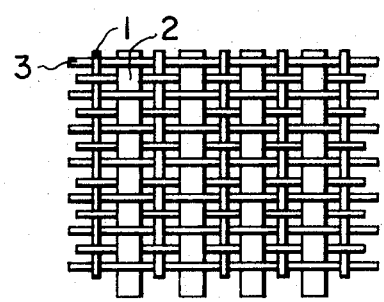
FIG. 6 is a plan view showing the structure of the fabric constituting the screen of this invention.

In one embodiment, the screen is manufactured from the fabric shown in FIG. 6, which is composed of a fine thread 1 of 50 – 100 deniers and a thick thread 2 of more than 10 times thicker to the fine thread 1 as warps and a fine thread 3 of 50 – 100 deniers as wefts and has spaces between the thick threads. As an example of the thick thread 2, a thread prepared by twisting together at 200 T/M four nylon filament yarn of 840 d. /140 f. twisted at 200 T/M in the S-direction is used. Also, as an example of the fine thread 1 or 3, a nylon filament yarn twisted at 100 T/M in the S-direction and subjected to steam set at 110° C. for 20 minutes may be employed. After weaving, the fabric is subjected to a heat set, scouring, and a treatment by a fluorescent brightening agent to provide the screen having excellent fastness and stability as well as good surface reflecting property. Spaces for transmitting the sound throughout the screen are also formed by punching the fabric.

Figure 7:
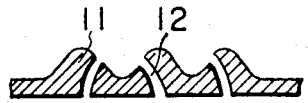
FIG. 7 and FIG. 8 are sectional views each showing the structure of a sheet material constituting the screen of this invention.
Figure 8:

FIG. 7 is a cross sectional view showing another embodiment of the screen of this invention having the aforesaid characteristics. The screen is a synthetic resin screen having a number of parallel ridges 11 arranged on the surface thereof and a number of perforations 12 for transmitting sound. The ridges are formed by embossing the surface of plastic sheet or by molding. The perforations 12 of the screen may be vertical to the surface of the screen as shown in FIG. 8.

For making the curved projection screen by arranging such screens, a method is known in the art in which a full size curved screen is made by securing a plurality of vertically elongated strips or sections of sheet material. However, the method encounters various troubles in making a hemi-spherical screen, in particular, in the case where the hall has no ideal slope for making such hemi-spherical screen.

As the result of intense investigations, the inventors have developed the projection screen as mentioned below.

FIG. 9 – FIG. 14 relate to spherical or partially spherical curved projection screens.

Figure 9:
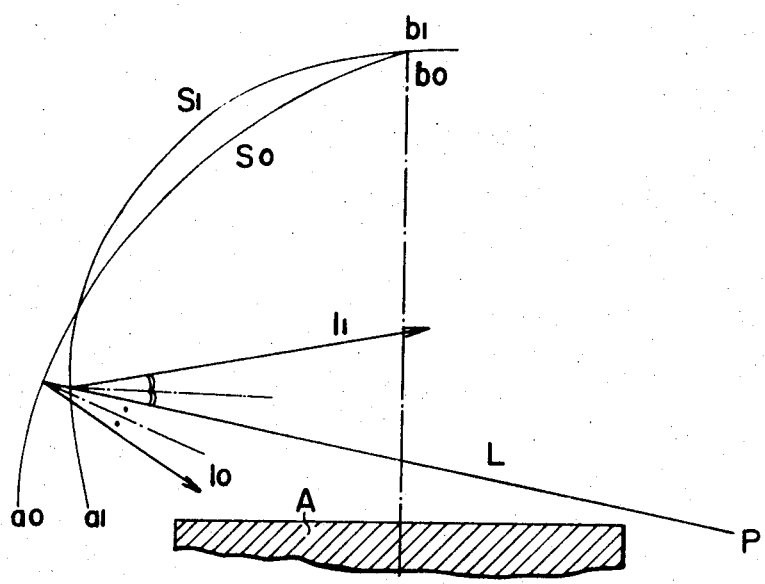
FIG. 9 is a side view showing the positional relations of the screen disposed at an ideally inclined angle, the screen disposed at an inclined angle slightly different from the ideal angle, the position of a projector, and the position of an audience area.
Figure 10:
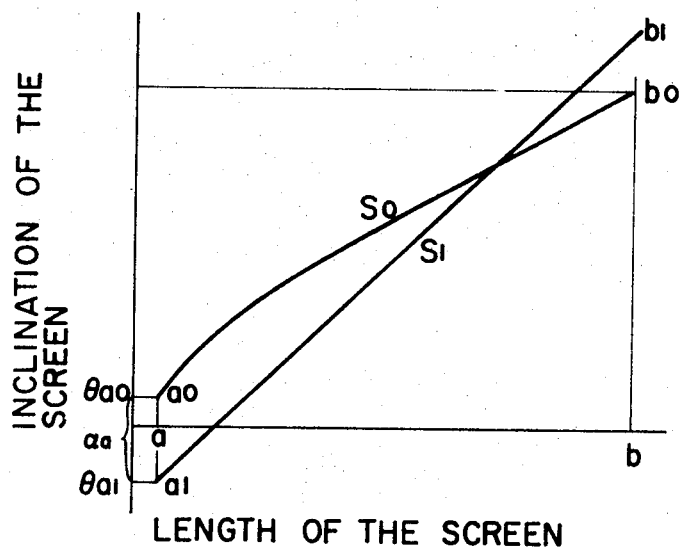
FIG. 10 is a graph showing the inclination angles of the screen at each portion on the spherical screen.
Figure 11:
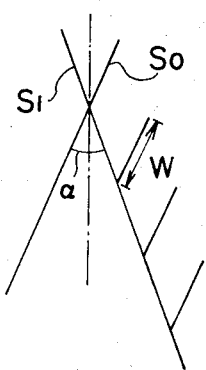
FIG. 11 is a side view showing the inclination angle of the tape constituting the screen of this invention.

In FIG. 9, an ideal curved projection screen $S_o$ having in the lower end $a_o$ and the upper end $b_o$ is illustrated. There is also shown in the figure a screen $S_1$ practically employed which has the lower end $a_1$ and the upper end $b_1$. When the light L from a projector P is reflected at the surface of the ideal screen $S_o$, the maximum reflected light is directed to the direction $l_o$ and hence intense or bright reflected light propagates to the direction of an audience area A. On the other hand, when the light from the projector is reflected at the surface of the screen $S_1$, the maximum reflected light is directed to the direction of $l_1$ and only a small amount of light, reflected at an angle considerably apart from the direction $l_1$ propagates to the audience area A. Therefore, when a screen having a sharp directivity is employed, a dark or faint projection image is viewed from the audience area A. Moreover, as the maximum reflected light $l_1$ is directed to the opposite side of the screen $S_1$, there is a reduction of the sharpness of the projection image on the screen. The inclination angles of the screens at each position are illustrated in FIG. 10, in which the difference between the inclination angle of the screen $S_o$ and the inclination angle of the screen $S_1$ in each position is shown by the vertical distance between the curve $S_o$ and the curve $S_1$ in the graph. If the difference between the inclination angles is called "correction angle $\alpha$," the correction angle $\alpha_a$, at a point (a) is shown by $\theta a_1 - \theta a_2$.

In order to provide the ideal inclination at each position of a screen shown, e. g., by $S_1$ having a shape other than that of the ideal screen $S_o$, the screen is cut into tapes and the whole screen is made again by inclining each tape at the correction angle $\alpha$.

Figure 12:
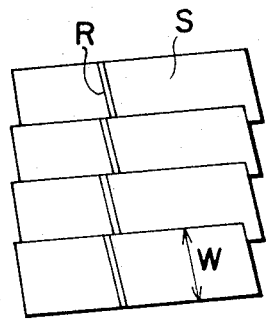
FIG. 12 is a perspective view of a part of the screen of this invention composed of a number of tapes.

In this case, the operation of making the screen is easier as the width of the tape is wider but if the width of the tape is wider than a value $W_1$, the projected image R is seen in a zig zag like as shown in FIG. 12 when the image is observed at a position apart from the screen having the image. Therefore, it is necessary to adopt the tape having a width as wide as possible in a range of giving no perceivable zig zag defect of the projected image.

Figure 13:
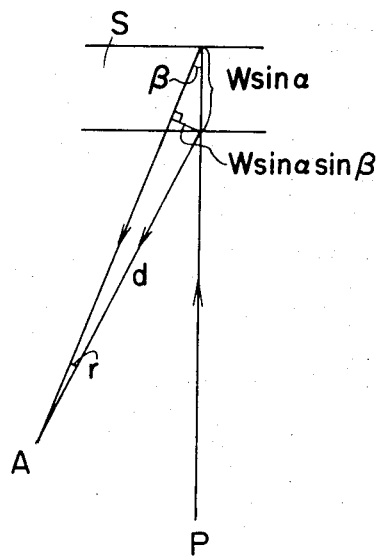
FIG. 13 is a plan view for explaining the formula A for determining the width of the tape constituting the screen of this invention.
Figure 14:
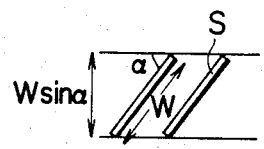
FIG. 14 is a side view of a part of FIG. 13.

In FIG. 13, and FIG. 14, when the position A of a spectator is disposed in the direction inclined at an angle of $\beta°$ from the direction of the incident light from a projector P to the screen S and the distance between the position A and the screen is d, the width of the tape of the screen is shown by the following equation $$W = d\tan\gamma/\sin\alpha\cdot\sin\beta$$

wherein $\alpha$ is a correction angle of the screen and $\gamma$ is a visual angle.

If the visual angle $\gamma$ is smaller, the zig zag defect is less perceivable but in the case of a wide projection screen, the magnification of the projected image from a photographic film is larger and hence the sharpness of the projected image itself is lowered. Therefore, in such case, even if the visual angle $\gamma$ is considerably larger than the resolving power of the eye, the zig zag defect of the projected image is not generally perceived. For example, in the projecting 8 perforation photographic film having a width of 35 mm. by magnifying the area thereof at 200,000 magnifications, the zig zag defect of the projected image is not perceived if $\tan\gamma$ is less than 0.0015. Therefore, in such a case, the zig zag defect of the projected image is not practically perceived if the tape has a width satisfying the following equation $$W \leq 0.0015 d/\sin\alpha\sin\beta$$

For instance, if $d$ is 8 meters, $\alpha$ is 20°, and $\beta$ is 60°, then $W \leq 40$ mm.

As clear from the above equation, the values of $d$, $\gamma$, $\alpha$ and $\beta$ are varied at each position of the screen and hence the width of the tape $W$ is also varied in each position of the screen. Accordingly, the width of the tape in each position of the screen may be varied but if the combination of such tapes having various different width is troublesome, the curved screen may be made by using a number of tapes divided into some groups, each of them having a width equal to the shortest width among all of the tape widths needed.

It is difficult to produce a large curved screen in one continuous piece. On the other hand, it is not easy to keep the three dimensional shape of the curved screen accurately. We tried various ways to produce it, and have found it to be the best way to build an assembly of a plural number of frames or the like, each having been covered with screen material. This way was revealed to be the best way to keep the tapes accurately in the calculated inclination angle as well.

We had two experiments for forming the curved screen. In producing a vertical screen, we fixed a number of pillars behind the tapes with folded surfaces. For a spherical screen, we fixed a number of tapes to many meridional members behind the tapes with folded surfaces. In both cases we got a curved screen the shape of which was kept accurately, the tapes of which had accurate inclination angles, and having no vertical or meridional gaps.

What is claimed is:

1. In a curved, wide angle projection screen, the improvement comprising a number of parallel ridges formed along vertical lines upon the surface of said projection screen which faces the projector and the audience area to cause the light reflected at an angle of 25° to the plane of incidence which intersects said screen along a vertical line to be at least 80 percent of the light reflected in said plane of incidence and the light reflected at an angle of 35° to the plane of incidence which intersects said screen along a vertical line to be between 40 and 75 percent of the light reflected in said plane of incidence and the light reflected at an angle of 25° to the plane of incidence which intersects said screen along a horizontal line to be at least 90 percent of the light reflected in said plane of incidence, and to cause light reflected at the angles of 60° and 75°, respectively, to the plane of incidence which intersects said screen along a horizontal line to be, respectively, 80 percent and 45 to 85 percent of the light reflected in said plane of incidence, said screen further including a sound absorber disposed on the side of said screen opposite that facing the audience area and having an acoustic absorptivity of at least 90 percent in the range of 300 c.p.s. to 4 k.p.s.

2. A curved wide angle projection screen, the improvement comprising a number of parallel ridges formed along vertical lines upon the surface of said projection screen which faces the projector and the audience area to cause the light reflected at an angle of 25° to the plane of incidence which intersects said screen along a vertical line to be at least 80 percent of the light reflected in said plane of incidence and the light reflected at an angle of 35° to the plane of incidence which intersects said screen along a vertical line to be between 40 and 75 percent of the light reflected in said plane of incidence and the light reflected at an angle of 25° to the plane of incidence which intersects said screen along a horizontal line to be at least 90 percent of the light reflected in said plane of incidence, and to cause light reflected at the angles of 60° and 75°, respectively, to the plane of incidence which intersects said screen along a horizontal line to be, respectively, 80 percent and 45 to 85 percent of the light reflected in said plane of incidence, and wherein said screen further comprises an assembly of plural frames, each of which is covered with screen material, and said screen material comprises a number of tapes, each tape having a height equal to the height of said frame and a width satisfying the following equation (A)

$$W \leq d \tan \gamma / \sin \alpha \cdot \sin \beta \qquad (A)$$

wherein $d$ is a distance between the screen and a spectator, $\gamma$ is an allowable visual angle, $\beta$ is the angle between the direction of the incident light and the direction of the light reflected from the screen to the spectator, said tapes being arranged as louvers on said frames, and each of said tapes being inclined from the surface of the frame by correction angle $\alpha$, said tapes forming said ridges.

3. A curved wide angle projection screen as claimed in claim 2, wherein each tape has the width of the narrowest tape width calculated from equation (A).

4. A curved wide angle projection screen as claimed in claim 2, wherein said frame comprises a number of vertical pillars and one tape is attached to each pillar.

5. A curved wide angle projection screen as claimed in claim 2, wherein said frame forms a portion of a hemisphere and comprises a number of meridianed pillars and one tape is attached to each pillar.

6. In a curved, wide angle projection screen, the improvement comprising a number of parallel ridges formed along vertical lines upon the surface of said projection screen which faces the projector and the audience area to cause the light reflected at an angle of 25° to the plane of incidence which intersects said screen along a vertical line to be at least 80 percent of the light reflected in said plane of incidence and the light reflected at an angle of 35° to the plane of incidence which intersects said screen along a vertical line to be between 40 and 75 percent of the light reflected in said plane of incidence and the light reflected at an angle of 25° to the plane of incidence which intersects said screen along a horizontal line to be at least 90 percent of the light reflected in said plane of incidence, and to cause light reflected at the angles of 60° and 75°, respectively, to the plane of incidence which intersects said screen along a horizontal line to be, respectively, 80 percent and 45 to 85 percent of the light reflected in said plane of incidence, said screen further including spaces for transmitting sound through said screen comprised of holes formed in said screen and extending completely through said screen, whereby the average sound transmittance at 100, 160, 250, 400, 640 and 1,000 C. P. S. is at least 90 percent and the average sound transmittance at 1.5, 2.5, 4, 6.4 and 10 K. P. S. is at least 80 percent, said screen further comprising a fabric, which is composed of a fine thread of 50 – 100 deniers and a thick thread of more than 10 times the thickness of the fine thread as warps, and a fine thread of 50 – 100 deniers as wefts and has spaces for transmitting sound between the thick warp threads, said ridges being formed of the thick threads which are periodically woven in the vertical direction of the screen with the holes for transmitting sound being formed at the intersticial spaces between the fine threads which completes the weave between the thick vertical threads.

* * * * *